United States Patent Office 3,503,993
Patented Mar. 31, 1970

3,503,993
4-KETO-1,3-DIOXANES
Roe C. Blume, Wilmington, Del., assignor to E. I. du Pont de Nemours and Company, Wilmington, Del., a corporation of Delaware
No Drawing. Filed June 8, 1965, Ser. No. 462,443
Int. Cl. C07d 15/04
U.S. Cl. 260—340.2
4 Claims

ABSTRACT OF THE DISCLOSURE

Novel 4-keto-1,3-dioxanes conforming to the formula

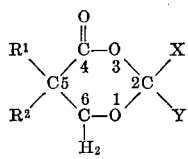

wherein $R^1$ and $R^2$ are selected from the group consisting of hydrogen, monocyclic aryl and lower alkyl and halogenated and phenoxy-derivatives thereof; $R^1$ and $R^2$ taken together with the carbon atom to which they are attached may form a nonaromatic cyclic structure of up to twelve carbon atoms; and X and Y are selected from the group consisting of hydrogen, lower alkyl, monocyclic aryl, and lower alkoxy-substituted monocyclic aryl, and lower alkoxy; X and Y taken together with the carbon atom to which they are attached may form a nonaromatic cyclic structure of up to twelve carbon atoms are useful for the preparation of β-lactones and as hygroscopic agents.

This invention relates to 4-keto-1,3-dioxanes and to a novel process for the preparation of β-lactones from such compounds.

An object of this invention is a novel process for the preparation of β-lactones. A further object is to provide new and useful 4-keto-1,3-dioxanes.

Other objects will become apparent from the specification and claims which follow.

The novel 4-keto-1,3-dioxanes contemplated by the present invention conform to the formula

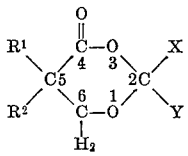

wherein $R^1$ and $R^2$ are selected from the group consisting of hydrogen, monocyclic aryl and lower alkyl and the halogenated and phenoxy-derivatives thereof; $R^1$ and $R^2$ taken together with the carbon atom to which they are attached may form a nonaromatic cyclic structure of up to twelve carbon atoms; and X and Y are selected from the group consisting of hydrogen, lower alkyl, monocyclic aryl, and lower alkoxy-substituted monocyclic aryl, and lower alkoxy; X and Y taken together with the carbon atom to which they are attached may form a nonaromatic cyclic structure of up to twelve carbon atoms.

Illustrative of such compounds are 2,2,5,5-tetramethyl-4-keto-1,3-dioxane,
5,5-dimethyl-4-keto-1,3-dioxane,
2-ethoxy-4-keto-1,3-dioxane,
5,5-diethyl-2,2-pentamethylene-4-keto-1,3-dioxane,
2-methoxy-5,5-dimethyl-4-keto-1,3-dioxane,
2-methoxy-5-methyl-5-propyl-4-keto-1,3-dioxane,
2-methoxy-5,5-(2′-penten-1′,5′-ylene)-4-keto-1,3-dioxane,
5,5-dimethyl-2-phenyl-4-keto-1,3-dioxane, and
2,2-diethoxy-5-phenyl-4-keto-1,3-dioxane.

The novel compounds of the present invention are readily distinguishable in both structure and function from related materials disclosed in the prior art. For example, the herbicidal polyhalogenated 4-keto-1,3-dioxane derivatives described in U.S. Patent 2,854,460 are shown to be stable in a strongly acidic aqueous medium, a property highly desirable for a hebicide whose prolonged effectiveness after application would be enhanced by a gradual decomposition under variable environmental conditions of soil acidity and seasonable rainfall. Similarly, the alkyl-substituted derivative of 4-keto-1,3-dioxane which is identified in J. Pharmacol. Exptl. Therap. 121, 234–51 (1957) as "Diketene-acetone adduct," but is shown to lack the double bond expected in such an adduct, is sufficiently stable to hydrolysis to permit its use in medical research involving human blood plasma. In contrast to these materials, the novel 4-keto-1,3-dioxanes of the present invention are useful by reason of their unique activity under aqueous and under acidic conditions. Thus, as will be demonstrated in examples which follow, the instant 4-keto-1,3-dioxanes constitute valuable agents for the obtaining of water free organic solvents and sources of valuable intermediates e.g., β-lactones, whose usefulness is well known in the art.

The dioxanes of the invention can be prepared by any of several methods although a single method may not produce every dioxane encompassed by the invention.

One reactane in the processes employed herein for the production of the novel dioxanes of the invention is a β-hydroxy acid or its formoxyderivative of the formula

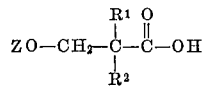

wherein $R^1$ and $R^2$ represent hydrogen, lower alkyl (i.e., 1–6 carbon atoms) and monocyclic aryl radicals and the halogenated and phenoxy derivatives thereof. Thus, $R^1$ and $R^2$ may be alkyl, e.g., methyl, ethyl, propyl, butyl; aryl, e.g., phenyl, xylyl; haloalkyl or haloaryl, e.g., chloromethyl, fluoromethyl, perfluoromethyl, chlorophenyl; phenoxyalkyl, e.g. phenoxymethyl; and in addition, $R^1$ and $R^2$ may together with the carbon atom to which they are bonded, form a nonaromatic cyclic structure containing no more than about twelve carbon atoms and having from four to eight carbon atoms in the ring. Z represents a hydrogen atom or a formyl radical.

Among suitable hydroxy acids, or derivatives thereof, to which the process of this invention may be satisfactorily applied are the following: 3-hydroxypropionic acid, 2,2-dimethyl-3-hydroxypropionic acid (hydroxypivalic acid), 2,2-diethyl-3-hydroxypropionic acid, 2-(n-hexyl)-2-methyl-β-hydroxypropionic acid, 2-ethyl-2-methyl-3-hydroxypropionic acid, 2,2-dipropyl-3-hydroxypropionic acid, 2,2-bis(chloromethyl)-3-hydroxypropionic acid, 2,2-dibutyl-3-hydroxypropionic acid, 1-hydroxymethylcyclohexane carboxylic acid, α,α-bis(phenoxymethyl)-β-hydroxypropionic acid, α-chloromethyl-α-methyl-β-hydroxypropionic acid, 1-hydroxymethyl-3-cyclohexene carboxylic acid, and α,α-bis(fluoromethyl)-β-hydroxypropionic acid, and the like, together with their formyl derivatives, as formoxypivalic acid. Such reactants may be prepared by established procedures, among which the aldol condensation and the Cannizzaro intramolecular oxidation-reduction of aldehydes are particularly useful. The β-monohydroxyaldehydes produced by the first named reaction may be oxidized to the β-hydroxycarboxylic acid by molecular oxygen, as disclosed in U.S. Patents, 2,411,700 and 2,437,410, while the 2,2-disubstituted-1,3-propanediols afforded by the Cannizzaro method, such as 2-(n-butyl)-2-ethyl-1,3-propanediol, whose preparation from excess formaldehyde and 2-ethylhexylaldehyde is described in the Journal of the American Chemical Society, vol. 70, page 948 (1948), may be oxidized to the α,α-disubstituted-β-hydroxypropionic acid by alkaline potassium permanganate by the procedure given in the Journal of the American Chemical Society, vol. 72, p. 5329 (1950), for the preparation of α,α-diethyl-β-hydroxypropionic acid. Similarly, the oxidation of pentaerythrityl dichloride by potassium permangate, as described in U.S. Patent 2,848,441, yields α,α-bis(chloromethyl)-β-hydroxypropionic acid. Methods for preparing α-alkyl-α-alkyl-α-phenyl-β-hydroxypropionic acids (e.g., α-methyl-α-phenyl-β-hydroxypropionic acid) are disclosed in British Patent 709,585 and U.S. Patent 3,028,399.

In one prepaartion of the novel 4-keto-1,3-dioxanes of this invention, the β-hydroxycarboxylic acid is reacted with an orthoester under anhydrous conditions. This reaction is advantageously carried out by dissolving the reactants in an inert solvent such as benzene and heating the resultant solution. Since these reactants produce two moles of an alcohol (derived from the orthoester) for each mole of the β-hydroxy acid reacted, the amount of alcohol produced is a measure of the completeness of the reaction. The alcohol is distilled from the reaction vessel as an azeotrope with benzene, preferably through a spinning-band column. The use of a solvent permits good control of the reaction temperature which, if allowed to rise too high, may induce decomposition and loss of the desired product. Ordinarily, reactants are employed in the ratio of 1 mole of the acid to between 1 and 2 moles of the orthoester in about 500–750 ml. of solvent. When methanol, for example, is the alcohol produced under these conditions, the benzene-methanol azeotrope (B.P. 58.3° C./760 mm.) is completely removed during a heating period of up to about 12 hours when a reflux ratio of 5–12 or higher is utilized. The remaining solvent is evaporated and the 4-keto-1,3-dioxane is isolated by distillation of the residue under high vacuum. If an inert solvent is not employed in this process, the reactants are heated until the theoretical quantity of alcohol is removed after which the residue is distilled as previously described. In either case, the reaction mixture can be heated to within the temperature range of about 30° C. to 150° C., preferably between 50° C. to 100° C., to form the 4-keto-1,3-dioxane. These 4-keto-1,3-dioxane preparations may be carried out, if desired, in the presence of an acidic agent selected from the class of reagents subsequently described herein as catalysts for the synthesis of 4-keto-1,3-dioxanes from formaldehyde dialkyl acetals.

A variety of types of orthoesters may be satisfactorily employed. These may be orthoesters of carboxylic acids of the formula $$R^3_p\text{—C—}(OR^4)_t$$

wherein $R^3$ represents hydrogen, a monovalent aryl radical of up to ten carbon atoms or a monovalent alkyl radical containing from one to about ten carbon atoms; $p$ is a cardinal number not greater than one; $R^4$ represents a lower alkyl monovalent radical containing from one to about six carbon atoms, or phenyl; $t$ is 3 or 4 and $p$ and $t$ total 4. The radicals represented by $R^4$ may be the same or different. Suitable orthoesters include those derived from carbonic acid, formic acid, acetic acid, benzoic acid, isophthalic acid, and the like. Among these, methyl orthopropionate and ethyl orthoformate may be specifically mentioned.

The use of a bis-orthoester in the dioxane synthesis described above results in the production of bis-ketodioxanes. Thus, the reaction of β-hydroxypivalic acid with hexamethylorthoisophthalate produces 2,2-m-phenylene-bis (5,5-dimethyl-2-methoxy-4-keto-1,3-dioxane). The bis (4-keto-1,3-dioxanes) produced in accordance with the invention have the formula:

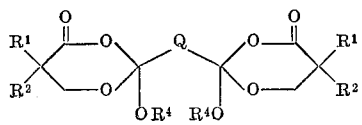

wherein $R^1$, $R^2$ and $R^4$ have the significance set forth hereinbefore and Q represents hydrocarbon of up to ten carbon atoms and may be aromatic, aliphatic or cycloaliphatic.

In another preparation of these 4-keto-1,3-dioxanes, the β-hydroxycarboxylic acid is reacted, according to any of the above-described procedures, with an acetal corresponding to the formula

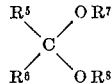

wherein $R^5$ is a lower alkyl radical (of 1–6 carbon atoms), or a phenyl radical, or an alkoxy-substituted phenyl radical, and $R^6$ represents $R^5$ or a hydrogen atom. Thus $R^5$ and $R^6$ may be methyl, ethyl, propyl, butyl, phenyl, p-methoxyphenyl; in addition $R^5$ and $R^6$ taken together with the carbon atom to which they are attached may form a nonaromatic cycle structure of up to twelve carbon atoms. $R^7$ and $R^8$ which may be the same or different represent lower alkyl (1–4 carbon atoms) radicals such as methyl, ethyl, propyl, and butyl. Representative acetals useful in this invention include methyl acetal, acetone dimethyl acetal, cyclohexanone dimethyl acetal, benzophenone diethyl acetal, benzaldehyde dimethyl acetal, 4'-methoxyacetophenone dimethyl acetal, and 4,4'-dimethoxybenzophenone dimethyl acetal. This reaction produces a 4-keto-1,3-dioxane bearing hydrogen atoms, monovalent lower alkyl radicals, or phenyl radicals, or alkoxy-substituted phenyl radicals or a combination thereof on the 2-position carbon atom, or a 4-keto-1,3-dioxane whose 2 position carbon atom is part of a nonaromatic cyclic structure.

The anhydrous reaction between a β-hydroxycarboxylic acid and formaldehyde dialkyl acetals, such as formaldehyde diethyl acetal, represents a special embodiment of this invention since an acidic catalyst is required to promote the reaction leading to compounds of the type represented by 5,5-dimethyl-4-keto-1,3-dioxane. The latter is prepared from formaldehyde diethyl acetal and hydroxypivalic acid. A preferred acidic catalyst for such reactions is an ion exchange resin of the type represented by "Amberlyst 15," since the catalyst is easily removed from the reaction mixture prior to isolation of the desired product. Additional acidic catalysts which are useful in this reaction include the acidic ion exchange resins, the soluble sulfonic acids, the organic carboxylic acids, and the inorganic acids which are subsequently described herein as useful for catalyzing the reaction by which β-lactones are prepared from the novel 4-keto-1,3-dioxanes of this invention.

In a still further preparation of suitable 4-keto-1,3-dioxanes, the preferred β-hydroxycarboxylic acids are reacted with either 1-alkenyl alkyl ethers of the class having the formula $$R^9CH\text{=}CR^{10}\text{—O—}R^{11}$$

wherein $R^9$ and $R^{10}$ represent a hydrogen atom or a lower alkyl (1–4 carbon atom) radical and $R^{11}$ represents a lower alkyl (1–4 carbon atom) radical, or with cycloalkenyl alkyl ethers of the class having the formula

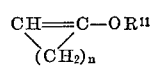

wherein $n$ is 3 or 4 and $R^{11}$ has the significance set forth hereinbefore. Ethers of these classes are exemplified by methyl vinyl ether and ethyl propenyl ether, and by cyclohexene methyl ether, respectively. This method differs from those previously described in that 1 mole of alcohol is produced for each mole of 4-keto-1,3-dioxane formed from the reactants. This by-product alcohol reacts with any excess ether present to form an acetal which is later separated from the reaction mixture by distillation. In addition, this synthesis further involves the addition of a hydrogen atom of the β-hydroxycarboxylic acid to the 2- position carbon atom of the vinylene linkage of the ether residue.

Preparation of the novel 4-keto-1,3-dioxanes of the invention are illustrated by the following examples.

EXAMPLE I

This example demonstrates the preparation of a 4-keto-1,3-dioxane by reacting an orthoester with a β-hydroxycarboxylic acid.

In a reaction flask fitted with a spinning-band distillation column are placed 11.7 g. of hydroxypivalic acid, 31.2 g. of methyl orthoformate, and 150 ml. of dry benzene. The resulting solution is heated to reflux and a benzene-methanol azeotrope is collected at 10:1 reflux ratio until the stoichiometric quantity of methanol is removed. The remaining solvent is evaporated and the residue distilled at a high vacuum. The desired product, 2-methoxy-5,5-dimethyl-4-keto-1,3-dioxane, is collected in 87% yield at 60°–62° C./0.4 mm.; $n_D^{25}$=1.4340. The nuclear magnetic resonance and infrared spectra confirm the structure of this compound.

EXAMPLE II

This example illustrates the preparation of a 4-keto-1,3-dioxane by reacting an aldehyde acetal with a β-hydroxycarboxylic acid.

In a reaction flask equipped with a spinning-band distillation column are placed 11.8 g. of hydroxypivalic acid (0.1 mole), 15.2 g. of benzaldehyde dimethyl acetal (0.1 mole), and 75 ml. of dry benzene. The contents of the flask are heated to reflux and the benzene-methanol azeotrope is collected. Heating is maintained for about 12 hrs. after which the remaining benzene is evaporated and the residue distilled under high vacuum. Aftr a small forerun is collected, the desired product, 5,5-dimethyl-2-phenyl-4-keto-1,3-dioxane, distills at 113° C./0.18 mm., with some of the product solidifying in the condenser. The product weighs 9.5 g., M.P. 87°–89° C., and has an infrared carbonyl absorption band at 5.7μ. A residue of 6.3 g. remains in the reaction vessel and, by infrared analysis, is found to be essentially hydroxypivalic acid.

*Analysis.*—Calculated for $C_{12}H_{14}O_3$ (percent): C, 69.80; H, 6.84; O, 23.27. Found (percent): C, 69.76; H, 6.76; O, 23.58.

EXAMPLE III

This example illustrates the preparation of a 4-keto-1,3-dioxane by reacting a vinyl ether with a β-hydroxycarboxylic acid.

Into a distillation apparatus fitted with a spinning-band column are charged 23.6 g. of hydroxypivalic acid (0.2 mole), 34.4 g. of ethyl propenyl ether (0.4 mole), and 100 ml. of dry benzene. The reaction mixture is heated at total reflux for 1 hour before collecting any distillate. After a quantity of ethyl propenyl ether distills, the solvent is evaporated and the residue distilled under high vacuum. Three fractions are collected: fraction A, 11.33 g., 64° C./1.0 mm.–74° C./1.25 mm., $n_D^{25}$ 1.4316; fraction B, 10.72 g., 78° C./0.95 mm.–83° C./0.55 mm., $n_D^{25}$ 1.4331; fraction C, 4 g., 84° C./0.55 mm.–92° C./0.35 mm. Fraction C contains the diethyl acetal of propionaldehyde (formed in situ by the reaction of excess ethyl propenyl ether with the by-product ethanol) and some hydroxypivalic acid which solidified during distillation. Infrared and nuclear magnetic resonance spectra show that fractions A and B consist essentially of the desired product, 2-ethyl-5,5-dimethyl-4-keto-1,3-dioxane. Nuclear magnetic resonance data, in particular, show that these fractions contain a minimum of about 80% of the desired 4-keto-1,3-dioxane.

EXAMPLE IV

This example illustrates the preparation of a 4-keto-1,3-dioxane by reacting a β-hydroxycarboxylic acid with an acetal of formaldehyde. A strongly acidic catalyst is required to initiate this reaction. In this example acetic anhydride is added to react with the by-product ethanol to force the reaction in the direction which favors production of the 4-keto-1,3-dioxane.

To a solution of 5.9 g. of hydroxypivalic acid (0.05 mole) and 10.42 g. of formaldehyde diethyl acetal (0.10 mole) dissolved in 9.5 ml. of acetic anhydride, is added 1 g. of "Amberlyst 15" resin and the mixture heated at 65° C. for 8 hrs. The resin is separated from the reaction mixture and the residual liquid is distilled under vacuum. The fraction isolated at 55° C./1 mm. consists essentially of the desired product, 5,5-dimethyl-4-keto-1,3-dioxane whose structure is confirmed by nuclear magnetic resonance spectroscopy.

The following Table I identifies a number of 4-keto-1,3-dioxanes and refers to the methods (described in Examples I–III) that were employed in their production. The 1-(hydroxymethyl)3-cyclohexenecarboxylic acid (M.P. 84°–85° C.) used to prepare the 4-keto-1,3-dioxane of Example VIII is obtained by the silver oxide oxidation of the precursory carboxaldehyde prepared from formaldehyde and 3-cyclohexenecarboxaldehyde by a procedure similar to that described in Monatsh. Chem. 21, 216 (1900) for the preparation of pentaldol. The symbols used in the table headings correspond to those in the formula

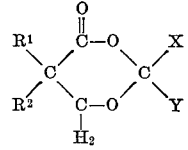

TABLE I

| Ex. No. | R¹ | R² | X | Y | B.P., °C./mm. | $n_D^{25}$ | Calc. C | Calc. H | Calc. O | Found C | Found H | Found O | Method of Example |
|---|---|---|---|---|---|---|---|---|---|---|---|---|---|
| V | Me | Et | H | OMe | 72/0.3 | 1.4408 | 55.16 | 8.10 | 36.74 | 55.1 | 7.9 | 36.8 | I |
| VI | Et | Et | H | OMe | 75/0.25 | 1.4464 | 57.43 | 8.57 | 34.00 | 57.5 | 8.5 | 34.0 | I |
| VII | Me | Pr | H | OMe | 78/0.3 | 1.4422 | 57.43 | 8.57 | 34.00 | 57.8 | 8.5 | 33.9 | I |
| VIII | —(CH₂)₂CH=CHCH₂— | | H | OMe | 115/0.3 | 1.4868 | 60.59 | 7.11 | 32.29 | 60.6 | 6.9 | 32.3 | I |
| IX | Me | Me | Me | Me | ¹ 57/0.6 | | 60.73 | 8.91 | 30.34 | 60.5 | 8.9 | | II |
| X | Me | Me | Me | OMe | 54/0.3 | 1.4204 | 55.16 | 8.10 | 36.74 | 55.2 | 8.0 | | I |
| XI | Me | φ | Me | Me | 98/0.09 | 1.5170 | 70.89 | 7.32 | 21.79 | 70.7 | 7.1 | | II |
| XII | H | H | H | OMe | 49/1.4 | | | | | | | | I |
| XIII | Me | Me | OEt | OEt | 62/0.15 | 1.4173 | 55.03 | 8.31 | 36.66 | 55.2 | 8.2 | | I |
| XIV | Me | Me | H | Me | 64/0.25 | 1.4156 | | | | | | | III ² |
| XV | Et | Et | —(CH₂)₄— | | 84–6/0.025 | 1.4708 | | | | | | | III |
| XVI | Et | Et | —(CH₂)₅— | | 124/1.1 | 1.4729 | | | | | | | III |

¹ M.P.=43°–44° C.
² Reaction conducted at 100° C. under autogenous pressure without solvent.

The 4-keto-1,3-dioxanes of Examples I–III and V–XVI can be employed to produce β-lactones as exemplified below. In addition, the novel compounds of this invention are useful hygroscopic agents. When the 4-keto-1,3-dioxanes of this invention are employed for these purposes, useful by-products may also be recovered, if desired. Thus, when a 4-keto-1,3-dioxane bearing two hydrocarbon groups on the 2-position carbon atom is thermally or hydrolytically decomposed, there is obtained a ketone. Those dioxanes having a single substituent in the 2-position, such as a hydrocarbon group of an alkoxy (or aryloxy) group, similarly yield an aldehyde or an ester, respectively. The ketones and aldehydes may be converted to acetals and re-employed for 4-keto-1,3-dioxane preparation, if desired. From 4-keto-1,3-dioxanes having two alkoxy or aryloxy substituents on the 2-position carbon atom, there are obtained carbonate by-products, such as ethyl carbonate, which is a useful solvent.

The relative ease by which β-lactones are obtained from these 4-keto-1,3-dioxanes is determined in part by the nature of the substituents attached to the ring. Generally, those 4-keto-1,3-dioxanes having one alkyl group and a hydrogen atom or two alkyl groups attached to the 2-position carbon atoms are more thermally stable than those bearing one alkoxy group and an alkyl, aryl, or other alkoxy group, or a hydrogen atom at that position. The nature of the substituents attached to the 5-position carbon atom also affects the relative ease of β-lactone formation, since those 4-keto-1,3-dioxanes having larger, bulkier groups (e.g., phenyl) at that position are generally more readily convertible to the corresponding β-lactone.

In the production of the β-lactones from 4-keto-1,3-dioxanes of the invention by thermally-induced ring contraction of the latter, there is normally, but not necessarily, employed an inert solvent such as benzene or dioctyl phthalate. Reaction temperatures used are in the range from 50° to 225° C. The conversion process is preferably conducted in the presence of a suitable catalyst. It has been found that their use substantially accelerates the reaction, as does the use of a higher temperature, such as one in the range from 125° to 225° C. Suitable catalytic agents are acids which may be of a wide variety of types. Strong nonvolatile acids which are unreactive with β-lactones under the reaction conditions by which the latter are produced in the process of this invention are useful. Effective soluble acids give a pH value of 3 or lower at a 1% concentration in water. Acids such as hydrochloric and hydrobromic are inapplicable not only because they are highly volatile but because they react extremely rapidly with the lactone formed. Suitable catalysts that are insoluble are acidic ion exchange resins, as "Amberlyst 15" [a], "Duolite C-3" [b], "Dowex 50" [c] (used in acid form), "Duolite C-20" [d] (used in acid form), "ES-65" [e] "ES-63" [f], and the like. Also useful are soluble sulfonic acids, p-toluene-sulfonic acid and benzenesulfonic acid, and the like.

Organic carboxylic acids, such as, for example, mono-, di-, or trichloroacetic acid, may also be useful as catalysts. Additionally, there may be employed such inorganic acids as sulfuric acid, phosphoric acid, and the like. These catalysts are present in the reaction mixture to the extent of between about 1% and about 5%, based on the weight of the reactant mixture. The insoluble ion-exchange resins may be removed by filtration and recycled, whereas the other types of acidic catalysts are inexpensive enough to be normally expendable, although they may be recovered if desirable.

The following examples show the preparation of the β-propiolactones from the dioxanes of the invention.

EXAMPLE XVII

This example illustrates the preparation of a β-lactone from 5,5 - dimethyl-2-methoxy-4-keto-1,3-dioxane prepared by the procedure described in Example I.

In a 5-ml. flask equipped for vacuum distillation are placed 2.0 g. of 5,5-dimethyl-2-methoxy-4-keto-1,3-dioxane and 0.10 g. "Amberlyst 15" resin. This reaction mixture is heated for 1 hour in an oil bath maintained at 125°–135° C., during which time a quantity of methyl formate distills over at a head temperature of 38–42° C.

[a] Trademark for Rohm and Haas Co. strongly acidic, macroreticular sulfonic acid resin.
[b] Trademark for the Chemical Process Co. sulfonic acid resin.
[c] Trademark for the Dow Chemical Co. sodium sulfonate resin.
[d] Trademark for the Chemical Process Co. sodium sulfonate resin.
[e] Trademark for the Chemical Process Co. phosphoric acid resin.
[f] Trademark for the Chemical Process Co. phosphonic acid resin.

The liquid remaining in the flask is distilled under vacuum and 2 fractions are collected: fraction A, 0.20 g., B.P. 43° C.–46° C./5.0 mm., and fraction B, 0.90 g., B.P. 46°–110° C./5.0 mm. A residue of 0.2 g. remains in the distillation flask. Infrared analysis confirms fraction A as substantially pure pivalolactone and fraction B as a mixture of about 20% pivalolactone and 80% of the 4-keto-1,3-dioxane starting material.

Following the general procedure of Example XVII, but varying the reaction conditions of temperature, heating time, and catalyst, α,α-diethyl-β-propiolactone (B.P. 72–73° C./8 mm.) is produced by treating dioctyl phthalate solutions of 5,5-diethyl-2-methoxy-4-keto-1,3-dioxane as indicated in the following Table II. Yields are based on the percentage of conversion of 0.1 mole amounts of the 4-keto-1,3-dioxane.

TABLE II

| Example | Catalyst | Maximum Temperature of Heating Bath, °C. | Total Heating Period, Minutes | Percent Yield of β-Lactone |
|---|---|---|---|---|
| XVIII | None | 170 | 150 | 66.5 |
| XIX | do | 184 | 55 | 69 |
| XX | p-Toluene-sulfonic acid. | 180 | 163 | 89.5 |
| XXI | Methanesulfonic acid. | 200 | 29 | 95 |

EXAMPLE XXII

This example demonstrates the usefulness of 4-keto-1,3-dioxanes of this invention under conditions where a water-free organic solvent is required during the course of a chemical reaction.

To a 10-ml. sample of N,N-dimethylformamide containing 0.27% water is added a 250-mg. quantity of 5,5-dimethyl-2-methoxy-4-keto - 1,3 - dioxane (4% excess). The small amount of water present reacts with the 4-keto-1,3-dioxane and removal of the water is followed by observing by the ultraviolet spectroscopy, the diminution of the 1925 mμ absorption band of water. The gradual rate of decrease of this band observed at 25° C. is accelerated by heating the solution at about 80° C. for 75 minutes. After a test sample is treated in this manner and subsequently allowed to stand overnight at room temperature, the complete removal of the water is demonstrated by the absence of the 1925 mμ absorption band in an ultraviolet spectrum of the sample. Additional solvents which can be dried in a similar way include dimethyl sulfoxide, N,N-dimethylacetamide, hexamethyl phosphoramide, acetonitrile, and the like.

If desired, one may proceed to prepare the β-propiolactones directly from the β-hydroxycarboxylic acids specified above without isolating the 4-keto-1,3-dioxanes. However, the latter always form as intermediates and can be identified in the reaction mixtures. In these syntheses, the reaction parameters of time, temperature, and use of a catalyst may be varied to promote facile formation of the β-lactones. Exemplifications of these syntheses are shown in the following examples.

EXAMPLE XXIII

This example illustrates the preparation of β-lactones from orthoesters and is characterized by the lack of catalysts and, in some cases, the lack of a solvent.

Part A

A recation mixture comprising 5.6 ml. of methyl orthoformate (0.05 mole) and a 5.4-g. (0.03 mole) quantity of α - methyl - α - phenyl - β - hydroxypropionic acid ($[\alpha]_D^{23} = -22°$ cm.$^3$ dec.$^{-1}$ g.$^{-1}$, in chloroform) dissolved in 30 ml. of benzene is heated at reflux for 15 hr., during which time the theoretical quantity (4.8 ml.) of methanol is azeotropically removed at 58° C. The remaining benzene is evaporated and the residue distilled to produce the theoretical quantity (4.9 g.) of α-methyl-α-phenyl-β-propiolactone, B.P.=104° C./0.5 mm., whose structure is confirmed by a strong infrared absorption band at 5.48μ.

Part B

In a manner similar to that described in A, above, a benzene solution of ethyl orthocarbonate and α-phenyl-β-hydroxy-propionic acid (i.e., tropic acid) is heated at 68° C. for 12 hours to remove the by-product ethanol. Fractionation of the residual liquid yields α-phenyl-β-propiolactone, B.P.=97°–101° C./0.25 mm., $n_D^{25}$=1.5320, whose structure is confirmed by infrared and nuclear magnetic resonance spectroscopy data.

Part C

In a manner similar to that described in A, above, but without the use of a solvent, a quantity of 1-hydroxymethyl-3-cyclohexenecarboxylic acid is heated at 100° C. with a slight excess of ethyl orthocarbonate until all the by-product ethanol is removed, after which the reaction temperature is briefly raised to 145° C. The reaction mixture is then distilled under vacuum. The desired 2-oxaspiro [3.5]non-6-ene-1-one is obtained as the fraction distilling at 72° C./0.45 mm., under which conditions it solidifies in the still head.

Part D

A reaction mixture comprising 11.81 g. (0.1 mole) of hydroxypivalic acid and 16.4 g. of methyl orthobenzoate in a distilling flask is heated for 1 hour in an oil bath maintained between 140–165° C. to produce 4.86 g. of methanol. The pressure is then lowered and the residue distilled at a pot temperature within the range of 180–195° C. to produce 6.77 g. of pivalolactone, B.P. 70–103° C./85–95 mm. The infrared spectrum of the β-lactone indicates that the product contains some ester contaminant. The final fraction collected is methyl benzoate. 10.3 g., B.P. 64–87° C./0.35 mm.

Part E

A reaction mixture comprising 11.81 g. (0.1 mole) of hydroxypivalic acid and 12.89 g. (0.045) of methyl orthoisophthalate in a distilling flask is heated for 0.5 hr., at a pressure of 50 mm., in an oil bath maintained within the range of 120°–125° C. and the methanol by-product is collected. The pressure is lowered and the residue is distilled over a period of 2.8 hr. at a pot temperature within the range of 130°–215° C. to produce 6.82 g. of pure pivalolactone, B.P. 39°–42° C./12 mm. A quantity of dimethyl isophthalate, B.P. 145°–148° C./12 mm., is subsequently collected from the residue in the flask.

EXAMPLE XXIV

β-Lactones bearing halomethyl or phenoxymethyl substituents on the α-carbon atom are prepared according to this example using the appropriate β-hydroxycarboxylic acids, an orthoester, and an acidic catalyst.

Part A

α,α-Bis(chloromethyl)propionic acid, whose preparation is described in The Journal of the American Chemical Society, vol. 70, page 4072 (1949), may be treated with a stoichiometric quantity of caustic solution according to the general procedure disclosed in Berichte der deutschen chemischen Gesellschaft, vol. 55, page B655 (1922), for the preparation of α-methyl-β-butyrolactone from α-methyl-β-bromobutyric acid, to produce in crude form α-chloromethyl-α-methyl-β-propiolactone. Treatment of an aqueous solution of this latter β-lactone with dilute phosphoric acid, followed by neutralization with sodium acetate and subsequent removal of the water by azeotropic distillation with excess benzene, produces crude α-chloromethyl-α-hydroxymethylpropionic acid (M.P. 81–84° C.) isolable from the residual benzene.

α-Chloromethyl-α-hydroxymethyl-propionic acid (15.25 g., 0.10 mole), methyl orthoformate (15.9 g., 0.15 mole), and 0.2 g. p-toluenesulfonic acid are stirred together in a distillation flask while being heated to 150° C., over a period of about 1 hour, with the residence time within the range of 135–150° C. being 15 minutes. The flask and contents are cooled, placed under vacuum (0.1 mm. Hg), and distilled (with reheating). By this procedure a total of 4.6 g. of material is removed as overhead product while the distillation pot temperature rises to 170° C.

The aforesaid overhead product assays 47% α-chloromethyl-α-methyl-β-propiolactone by vapor-phase chromatographic analysis, i.e., through comparison of elution time with that of a purified sample (B.P. 55° C./1.6 mm.) of the previously prepared α-chloromethyl-α-methyl-β-propiolactone.

Part B

From the hydrobromic acid treatment of 3,3-bis(phenoxymethyl)oxetane, preparable by the method disclosed in The Journal of the Chemical Society (London) (1955), page 3648, is obtained α,α-bis(phenoxymethyl)-β-bromopropanol as an uncrystallizable yellow oil. The latter material, in turn, is oxidized with a mixture of chromium trioxide and concentrated sulfuric acid to α,α-bis(phenoxymethyl)-β-bromopropanoic acid, isolable as a yellow oil which solidifies on standing to tan crystals (purified M.P. 114–116° C.).

α,α-Bis(phenoxymethyl)-β-bromopropanoic acid (3.65 g., 0.01 mole) is hydrolyzed by refluxing for 30 minutes in 10 ml. of ethanol containing 1.5 g. of potassium hydroxide. This reaction mixture is filtered and the filtrate evaporated. The residue is taken up in 30 ml. of ethyl acetate, filtered, 10 ml. of petroleum ether added to the filtrate which is then chilled. There is obtained therefrom 1.78 g. of α,α-bis (phenoxymethyl)-β-hydroxypropionic acid (M.P. 140–145° C.

α,α-Bis(phenoxymethyl)-β-hyroxypropionic acid (1.50 g., 0.005 mole), methyl orthoformate (1.06 g., 0.01 mole), and 0.05 g. "Amberlyst 15" are heated together at 95° C. for 30 minutes, after which the pot temperature is raised to 135–140° C. and kept thereat for 15 minutes. The reaction mixture is then taken up in about 10 ml. of ethyl acetate, filtered to remove the catalyst, and chilled to induce crystallization of the product. An initial crop of 0.17 g. of α,α-bis(phenoxymethyl)-β-propiolactone is obtained, M.P. 129.5–131° C.

Among other β-lactones preparable from an orthoester and the appropriate carboxylic acid by the procedures described above may be mentioned α,α-pentamethylene-β-propiolactone (B.P. 47°–8° C./0.2 mm.) and α,α-bis (fluoromethyl)-β-propiolactone (B.P. 82°–84° C./4 mm.).

The following example illustrates the preparation of a β-lactone by reacting an orthoester with formoxypivalic acid.

EXAMPLE XXV

A mixture of 14.6 g. (0.1 mole) of formoxypivalic acid, 19.4 g. (0.18 mole) of methyl orthoformate, and 1 g. of "Amberlyst 15" is placed in a 50-ml. flask and distilled through a short Vigreux column at atmospheric pressure to produce 7.5 g. of forerun, with the pot temperature not exceeding 85° C. The pressure within the system is then lowered and 7.1 g. of distillate is collected at 25–70° C./6 mm. in two fractions which are subsequently combined and redistilled to produce 3.2 g. (0.032 mole) of pivalolactone, 32% conversion.

In these direct preparations of β-lactones, there may also be employed orthoesters of inorganic oxygen-containing acids of the class having the formula

wherein M represents boron, phosphorus, or silicon; $R^{12}$ represents a lower alkyl monovalent radical containing from 1 to about 6 carbon atoms, or a phenyl radical, and q is 3 or 4. The radicals represented by $R^{12}$ may be the same or different. Suitable orthoesters of this class include those derived from boric acid, silicic acid, and orthophosphorous acid, and the like.

In the following Table III are presented the results of a series of experiments which demonstrate the usefulness of orthoesters of the class represented by

above, for converting β-hydrocarboxylic acids to the corresponding β-lactones. For comparative purposes, the result obtained when using methyl orthopropionate is included. In the experiments of this series, a mixture of 1.18 g. (0.01 mole) of hydroxypivalic acid, 0.02 mole of an orthoester (different in each experiment), and 0.01 g. of "Amberlyst 15" (not used in Example XXIX) is heated within the range of 110° C.–150° C. for 15–30 minutes, the temperature being measured by a thermocouple on the bottom of the reaction vessel. Heating is halted and the contents of the reaction flask are then diluted with diethyl carbonate to a total volume of 25 ml., following which a small sample is removed therefrom and analyzed for pivalolactone content by vapor phase chromatography (VPC).

The VPC analysis is preformed in a F and M Scientific Co. Model 500 instrument having a hot wire detector. The chromatographic column employed is constructed of a 152.4 cm. length of stainless steel tubing having an inside diameter of 0.476 cm. and is packed with 20% dimer acid/silicone oil 550 on 40/60 mesh acid washed Chromosorb R (trademark for the Johns-Manville Co.'s specially treated and screened diatomaceous earth). The instrument is programmed to operate with a 7.9° C. per minute temperature rise, starting from 75° C., and a helium flow of 60 ml. per minute. The yield of pivalolactone in each instance is determined by comparison of peak heights with those of previously calibrated standards. A standard "area under a curve" is obtained by VPC analysis of a 4% solution of pivalolactone. This definition of 4% is based upon the solution containing 1 gram of pivalolactone ($\rho=1$) in a total volume of 25 ml. (diluent was diethylcarbonate). The experimental reaction mixture samples are made up so that the theoretical quantity of pivalolactone obtainable by the reaction cannot be greater than 1 gram. When the reaction is completed or stopped, the contents of the reaction vessel are diluted with diethyl carbonate to a total volume of 25 ml. and a microsample thereof is submitted to VPC analysis. An indication of a 4% content of β-lactone in the diluted contents of the reaction vessel represents 100% yield of the β-lactone. The principal features of these experiments are recorded in Table III.

TABLE III

| Example | Orthoester | (Min.) at 110-150° C. | Percent Yield Pivalolactone |
|---|---|---|---|
| XXVI | $(C_2H_5O)_3B$ | 15 | 25 |
| XXVII | $(CH_3O)_3C-C_2H_5$ | 30 | 47 |
| XXVIII | $(C_2H_5O)_4Si$ | 20 | 55 |
| XXIX[1] | $(C_2H_5O)_3P$ | 30 | 50 |

[1] No acidic catalyst used.

EXAMPLE XXX

This example illustrates the direct preparation of a β-lactone from a β-hydroxycarboxylic acid and a 1-alkenyl alkyl ether according to the process of this invention.

Into distillation apparatus are charged 24.6 g. of α,α-diethyl-β-hydroxypropionic acid, 20 g. of methyl isopropenyl ether, and 100 ml. of dry benzene. The solution is heated at 50°–80° C. for 6 hours at which time the head temperature reaches the boiling point of benzene. The solution is then concentrated under vacuum at 25° C. and 0.25 g. of "Amberlyst 15" and 50 ml. of dioctyl phthalate are added to the residual 5,5-diethyl-2,2-dimethyl-4-keto-1,3-dioxane. The resulting mixture is heated for 45 minutes at 218°–255° C. The α,α-diethyl-β-propiolactone is recovered at 96° C./12 mm. by fractional distillation of the reaction mixture. The product exhibits the 5.48μ infrared absorption band characteristic of β-lactones.

When acetone dimethyl acetal is used in place of the methyl isopropenyl ether according to the general procedure of the preceding paragraph, α,α-diethyl-β-propiolactone is similarly obtained.

EXAMPLE XXXI

This example illustrates the preparation of 2,2'-m-phenylenebis(5,5 - dimethyl - 2 - methoxy-4-keto-1,3-dioxane) according to the process of this invention.

A mixture of 14.3 g. (0.05 mole) of hexamethylorthoisophthalate, preparable by the procedure of J. Org. Chem., 27, 3098 (1962), 11.8 g. (0.1 mole) of hydroxypivalic acid, and 200 ml. of dry benzene and stirred and distilled slowly through a spinning band column for 6 hours to remove the benzene-methanol azeotrope. The liquid remaining in the distillation flask is evaporated under vacuum and the residual material is removed. The infrared spectrum of the residual product shows a carbonyl absorption band at 5.65μ, together with a series of sharp bands at 8.0, 8.45, 8.65, 9.15, 9.3, 9.8–9.9, and 10.4μ which are indicative of the desired 2,2'-m-phenylenebis(5,5-dimethyl-2-methoxy-4-keto-1,3 - dioxane). The nuclear magnetic resonance (NMR) spectrum of this material shows absorption at 7.25–7.8σ, 3.85σ, 3.1–3.2σ, 1.0–1.3σ in the ratio of 4/4/6/12, giving further confirmation of the structure of the desired product. σ is expressed in p.p.m. as referred to tetramethylsilane. These data were obtained on a varian A–60 High Resolution NMR Spectrometer with tetramethylsilane as an internal standard.

EXAMPLE XXXII

This example illustrates the preparation of 2,5,5-trimethyl-2-p-methoxyphenyl-4-keto-1,3-dioxane from 4'-methoxyacetophenone dimethyl acetal according to the process of this invention.

The dimethylacetal of 4'-methoxyacetophenone is prepared by refluxing 1 mole of 4'-methoxyacetophenone for 2 hours with 3 moles of methyl orthoformate and 6 moles of methanol in the presence of 3 g. "Amberlyst 15". The reaction mixture is distilled and the acetal product is isolated as the fraction boiling at 67° C./0.6 mm., $n_D^{25}=1.5034$. The infrared spectrum of this product is free of carbonyl absorption bands and displays a series of bands in the 8–10μ region which are indicative of the expected acetal.

A reaction mixture comprising 4'-methoxyacetophenone dimethyl acetal (0.1 mole), hydroxypivalic acid (0.1 mole), and 100 ml. of dry benzene is charged to a distillation flask. This mixture is distilled slowly through a spinning band column, operated at a 10:1 reflux ratio, for 4 hours to remove all the benzene-methanol azeotrope. The reaction mixture is then evaporated and a small sample of the residue removed for analysis. The infrared spectrum of this sample shows a carbonyl band at 5.7μ and a series of sharp, strong bands at 8.0, 8.35, 8.5, 9.1, 9.3, 9.65, 10.5, and 12.0μ, indicative of the expected 2,5,5 - trimethyl-2-p-methoxyphenyl-4-keto-1,3-dioxane. The nuclear magnetic resonance spectrum of this sample obtained by the previously-described method, shows absorption at 7.1δ, 3.8δ, 3.45δ, 1.7δ, 1.38δ, and 0.94δ in the ratio of 4/3/2/3/3/3 as expected for the product.

A portion of this keto-dioxane is dissolved in 50 ml. of dibutylphthalate and heated at 200° for 10 minutes. The contents of the reaction vessel are distilled in a pressure of 10 mm. while being heated to a pot temperature not exceeding 160° C. to yield 2.7 g. of pivalolactone. The pivalolactone's infrared spectrum is identical with that of a known sample.

What is claimed is:
1. 2-methoxy-5,5-dimethyl-4-keto-1,3-dioxane.
2. 5,5-diethyl-2-methoxy-4-keto-1,3-dioxane.

3. 5,5-dimethyl-2-methoxy-2-methyl-4-keto-1,3-dioxane.
4. 5,5-dimethyl-4-keto-1,3-dioxane.

References Cited

UNITED STATES PATENTS 2,854,460　9/1958　Hennes et al. _____ 260—340.2
2,911,414　11/1959　Simmons _____ 260—340.2

OTHER REFERENCES

Chemical Abstracts, 6th Collective Index, p. 9573S.
Kahn: Jour. Pharmacol. Exptl. Therap., vol. 121, p. 242.

NORMA S. MILESTONE, Primary Examiner

U.S. Cl. X.R.

260—343.9, 521, 535, 561